April 9, 1963
RENATE DANKWARDT NEE MARO ETAL
3,084,689
DEVICE FOR TREATING, DISINFECTING AND CLEANSING CAVITIES IN THE HUMAN BODY
Filed Oct. 11, 1961
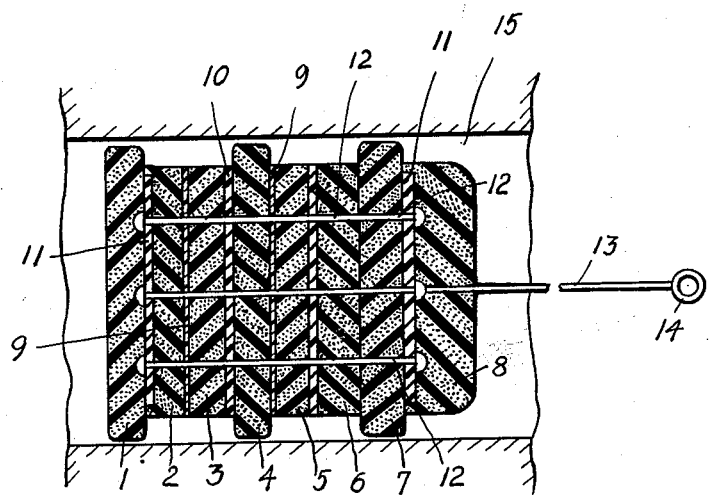
INVENTORS
R. Dankwardt, née Maro
& J. Ellrich
By Lowry & Rinehart
ATTYS.

United States Patent Office 3,084,689
Patented Apr. 9, 1963

3,084,689
DEVICE FOR TREATING, DISINFECTING AND CLEANSING CAVITIES IN THE HUMAN BODY
Renate Dankwardt, nee Maro, Hamburg, and Johannes Ellrich, Hamburg-Altona, Germany; said Ellrich assignor to said Dankwardt, nee Maro
Filed Oct. 11, 1961, Ser. No. 144,463
Claims priority, application Germany Oct. 18, 1960
1 Claim. (Cl. 128—270)

This invention relates to a device of absorbent material for treating, disinfecting and cleansing cavities in the human body.

In the sanitation of human beings and mammals it is frequently necessary, either prophylactically or for initiating or providing a basis for healing processes, to insert so-called tampons or "plugs" into cavities in the human body.

These tampons or plugs serve the purpose of bringing medicines or drugs either in the form of liquid, semi-liquid, gelatinous or unctuous emulsions or also of solid consistency into contact with the mucous membranes lining the cavities in the human body.

A plurality of materials appear to be useful for making such plugs. Most of these materials, however, do not meet the hygienic requirements and hardly allow medicinal liquids to act on a desired place for a relatively long period of time.

Experiences have proved that the absorbency of the materials heretofore used for the plugs decreases after a short period of time and so the medicinal liquids are bound to yield to their natural tendency to gravity flow. Other materials that have a high liquid-absorbing characteristic begin to disintegrate after a short period of time.

It is the object of the present invention to overcome the above-mentioned deficiencies and to provide a device for treating, disinfecting and cleansing cavities in the human body, which is simple in construction and which will effectively and efficiently perform the purposes for which it is intended.

The device according to the invention comprises a plurality of disc-like porous layers of absorbent material arranged in juxtaposition, insulating layers forming partitions between said porous layers and reinforcing plates interposed between said porous layers in optionally alternating relationship with said insulating layers.

The absorbent material of the disc-like porous layers may be germ-repellent synthetic plastic material, foamed material or sponge-like material. The arrangement of the disc-like porous layers in juxtaposed relationship ensures a snug fit and adhesion of the device to the cavities in the human body as said device is inserted, without irritating the sensitive mucous membranes or hurting the cellular tissue. Minor anatomical anomalies, if any, may easily be compensated by the disc-like configuration of the juxtaposed layers.

The individual disc-like porous layers are interconnected and at the same time insulated from one another by means of insulating layers formed by cementing, heat-sealing or any other processes appropriate for this purpose. By inserting additional insulating layers in the form of impermeable and non-porous foils the disc-like porous layers are fully separated from each other. This, however, does not affect the absortive capacity of the disc-like porous layers, since the medicinal liquid to be introduced will easily be absorbed by the pores remaining uncovered.

The size of the device is of great importance. Its height is meant to be at least equal to the largest diameter of the cavity so that there is no possibility of the device slipping out of place or being mispositioned as it is introduced. Thereby an equally good obturation is obtained at all times.

The individual layers of absorbent material are preferably of different size and thickness and have various pores.

The device may be constructed in such a manner that one or more wires, cords, bands or threads extend entirely or partially therethrough. These threads extend axially through the individual layers and may be secured to the reinforcing plates which prevent the device from getting wedged or canted when it is being removed and one of them may protrude from at least one end face of said device to serve for easy removal thereof from the cavity in the human body. The free end of the thread may be provided with a hold of suitable material for easy location of the thread. Predetermined markings on the hold, moreover, may serve for convenient identification of the type of tampons or plugs used.

A preferred embodiment of the invention will now be described by way of example and with reference to the accompanying drawing of which the single FIGURE is a longitudinal section through a device according to the invention.

The drawing shows a device which serves as a tampon or plug and is composed of disc-like porous layers 1 to 8 made of absorbent, germ-repellent synthetic plastic material, foamed material or sponge-like material and arranged in juxtaposed relationship. The individual porous layers are interconnected by layers 9 of an adhesive or in a similar manner. The hardened adhesive forms an insulating layer between the individual porous layers 1 to 8 of absorbent material. In addition, impermeable, non-porous foils 10 are interposed between the individual porous layers 1 to 8 of absorbent material. In order to prevent a canting of the device as it is being inserted into a cavity 15 in the human body, additional holding or reinforcing plates 11 are provided. To these reinforcing plates 11 preferably provided on either end of the device, one or more threads 12 or the like are affixed which extend axially through the tampon or plug. From at least one end face of the device there protrudes a long thread 13 serving for easy removal of the device from the cavity 15 in the human body. The free end of the long thread 13 is provided with a hold 14.

In varying sequence the porous layers 1 to 8 may be of different size and thickness and may also have various pores depending on the kind of application desired.

Although a preferred embodiment of the invention has been described in detail herein and illustrated in the accompanying drawing, it is to be understood that the invention is not limited to this precise embodiment, particularly with respect to the materials specified in connection therewith, and that various changes and modifications may be effected therein, without departing from the scope or spirit of the invention as defined in the appended claim.

We claim:
A device adapted for insertion into a cavity in the human body for medicinal purposes comprised of a plurality of porous absorbent discs of different sizes and different degrees of porosity including end discs and a plurality of intermediate discs, the latter being highly porous and adapted for the reception of a fluid medicament for extrusion into contact with the wall of the body cavity, said disc being aligned axially, fluid impervious foil sheets interposed between certain adjacent discs, fluid impervious layers of hardened adhesive between certain other adjacent discs, relatively rigid reinforcing plates between each end disc and said intermediate discs, a plurality of axial reinforcing threads extending through said reinforcing plates and said intermediate discs, and at least one elongated thread extending through one of said end discs to facilitate removal of the device from a body cavity.

References Cited in the file of this patent

UNITED STATES PATENTS

| | | |
|---|---|---|
| 2,330,257 | Bailey | Sept. 28, 1943 |
| 2,858,831 | Graham | Nov. 4, 1958 |
| 2,938,519 | Marco | May 31, 1960 |

FOREIGN PATENTS

| | | |
|---|---|---|
| 718,042 | France | Jan. 18, 1932 |